Aug. 11, 1953 A. RAPPL 2,648,352
REMOTE-CONTROLLED VALVE FOR WINDSHIELD CLEANERS
Filed April 24, 1948 2 Sheets-Sheet 1

INVENTOR
Anton Rappl
BY
Beau, Brooks, Buckley & Beau.
ATTORNEYS

Aug. 11, 1953                A. RAPPL                 2,648,352
              REMOTE-CONTROLLED VALVE FOR WINDSHIELD CLEANERS
Filed April 24, 1948                            2 Sheets-Sheet 2
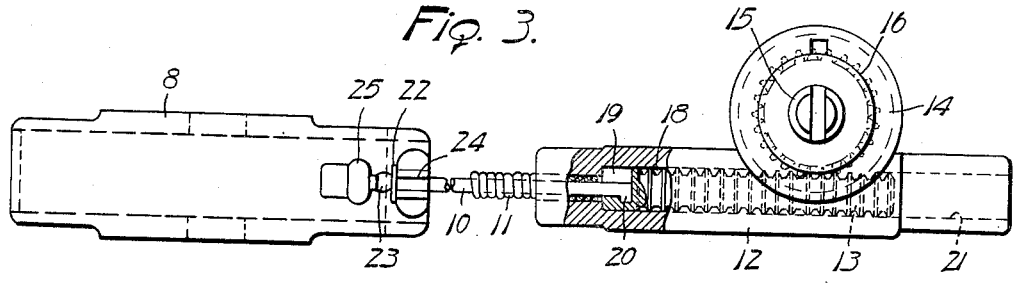
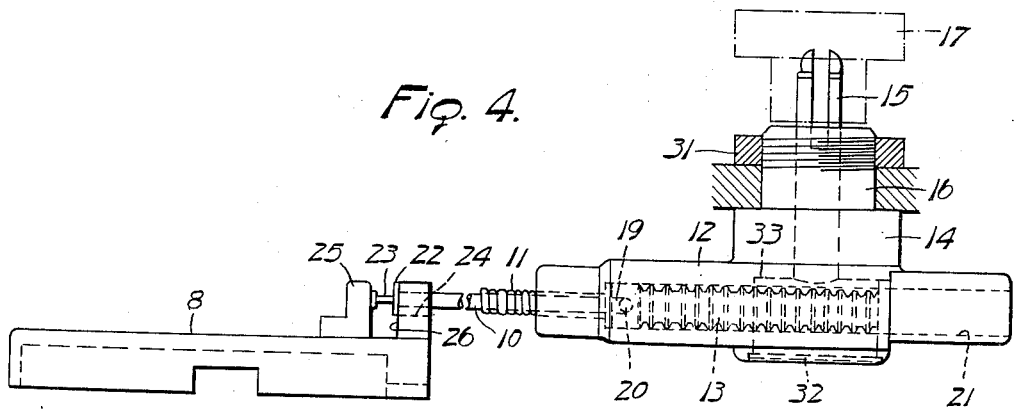
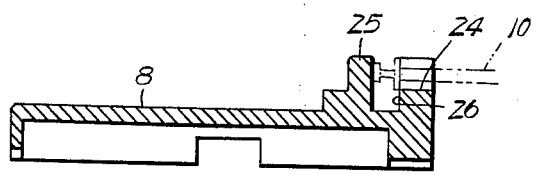
INVENTOR
*Anton Rappl*
BY
*Beau, Brooks, Buckley+Beau.*
ATTORNEYS Patented Aug. 11, 1953

2,648,352

UNITED STATES PATENT OFFICE 2,648,352

REMOTE-CONTROLLED VALVE FOR WINDSHIELD CLEANERS

Anton Rappl, Eggertsville, N. Y., assignor to Trico Products Corporation, Buffalo, N. Y.

Application April 24, 1948, Serial No. 23,105

2 Claims. (Cl. 137—764)

This invention relates to the windshield cleaner art and particularly to a remote control for the cleaner motor or other accessory.

It has heretofore been proposed to utilize a flexible push-pull wire enclosed within a reinforcing or guiding sheath for effecting a regulating adjustment of the accessory valve. The primary object of this invention is to simplify the remote control construction and to facilitate its installation on or attachment to the accessory, and, further, to provide a remote control unit capable of ready replacement in the case of repair.

The invention will be more readily apprehended from the following description in which reference is made to the accompanying drawings wherein:

Figs. 3 and 4 are, respectively, plan and side elevations, in fragment, of the unit as attached to the accessory valve housing; and Fig. 5 is a longitudinal sectional view through the valve housing.

Figure 1:
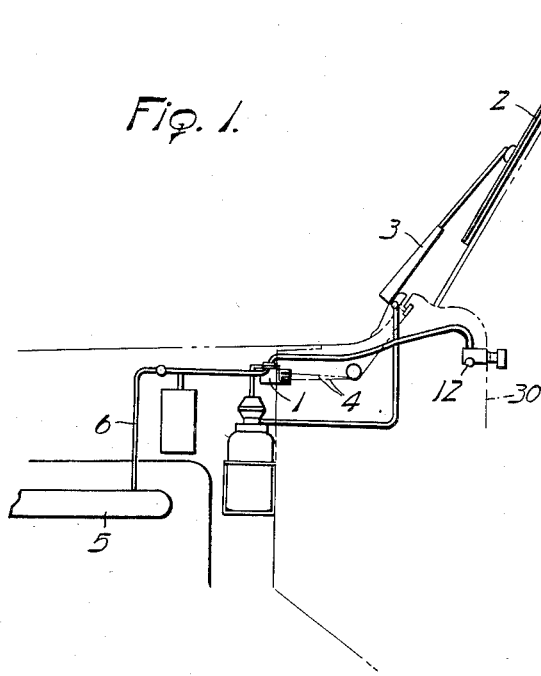
Fig. 1 is a schematic view showing the general layout of a motor vehicle accessory system embodying the present invention.
Figure 2:
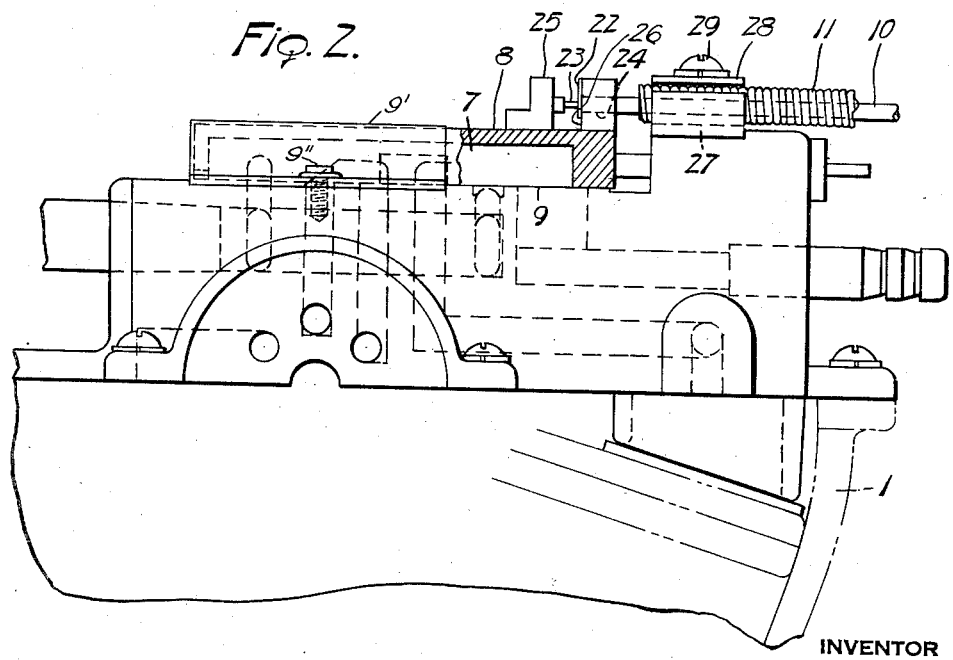
Fig. 2 is an enlarged fragmentary view partly in section of an accessory depicting more clearly the attachment of the unit thereto.

Referring more particularly to the drawings, the numeral 1 designates, by way of example, the fluid motor of a windshield cleaning system, 2 the wiper or blade, and 3 its actuating arm which is oscillated by a suitable transmission 4 connecting with the motor. The power supplied the motor may be the suction influence of the manifold 5 to which latter it is connected by a conduit 6 and valve 7. This valve is enclosed by a housing 8 for sliding therewith on a ported seat 9 preferably in the form of a rubber block fully disclosed in my Patent No. 2,617,136. A guiding strap 9' is held by a screw 9''.

The remote control unit comprises a Bowden type wire having a push-pull wire 10 sheathed within a flexible guiding armor 11 and connected at one end to a gear housing 12 in which slides a rack 13 that meshes with a pinion 14 fixed on a shaft 15. The shaft is journaled in a bearing extension 16 of the gear housing and is adapted to receive an actuating knob 17 so that by turning the knob the wire will be shifted axially within its armor. The gear housing snugly receives one end of the armor 11 to anchor it thereto and is formed with a counterbore chamber 18 to slidably receive the rack 13. The cable end of the rack is formed with a recess 19 to interlockingly receive the angular terminal 20 of the wire. By this coupling the wire may be engaged in its seat or recess 19 and thereafter the two inserted through the open end 21 into the gear housing which latter will secure the interlock against detachment.

The far end of the wire protrudes from its armor and carries a washer 22. Beyond the washer the wire is flattened, as at 23, to retain the washer in place. Thereby the unit is held together. The valve housing 8 is formed with a wire seat 24 and an abutment 25 spaced therefrom. The spacing of the abutment is sufficient to receive the washer 22 and the flattened wire terminal 23. The motor casing is provided with an armor seat 27 formed on an upstanding boss to elevate it above the valve seat 9 and to dispose it substantially coplanar with the wire seat 24. Both the wire seat and the armor seat open upwardly so that the placement of the armor in its seat will also effect the interlock of the projecting wire with the valve. In effecting the connection with the valve housing the wire terminal and washer are placed between the abutment and the seat 24 with a snug fit in which the washer presses against the shoulder 26. The armor 11 is next clamped in its seat 27 on the motor casing by a plate 28 and screw 29. This armor securement also holds the wire in its seat. The rack 13 may be cylindrical with circular teeth so that the wire will be free to revolve within its armor. The washer 22 further enables the wire to freely rotate since it guards the flat or lug 23 from slipping through the wire seat. The gear housing is suitably mounted on the instrument board 30 as by a clamp nut 31. A closure disk 32 is pressed into place to close the pinion chamber 33 after placement of the shaft 15 and the pinion 14 in the housing.

The remote control unit is simple in construction and economical in design, its parts being easily and compactly assembled and the unit quickly installed with minimum effort. The foregoing description is given in detail but without thought of limitation since the inventive teachings are capable of assuming other physical embodiments without departing from the spirit of the invention and the scope of the appended claims.

What is claimed is:

1. In a valve and operator therefor, a supporting structure having a ported valve seat and having means providing an armor receiving seat projecting from the valve seat, a valve carrying an operating wire seat and slidably mounted on said valve seat for controlling said port, an armor housing a push-pull wire with an end portion of said wire projecting from an end of said armor, said armor seat and said wire seat each comprising a laterally open longitudinal recess, said openings being longitudinally aligned to receive said ends of said armor and said wire respectively, means for retaining said end of the armor in its recess, said end portion of said wire having means cooperating with said valve and wire seat whereby said valve can be operated by said wire.

2. In a valve and operator therefor, a supporting structure having a ported valve seat and having means providing an armor receiving seat projecting from the supporting structure adjacent the valve seat, a valve carrying an operating wire seat and slidably mounted on said valve seat for connecting port means therein, an armor housing a push-pull wire with an end portion of said wire projecting from an end of said armor, said armor seat and said wire seat each comprising a laterally open longitudinal recess, the recesses being longitudinally aligned to receive said ends of said armor and said wire respectively, means for retaining said end of the armor in its recess, said end portion of said wire having an enlargement precluding the latter pulling axially out of the recess of said wire seat in one direction of movement and said valve having an abutment against which the wire abuts for reverse wire movement whereby said valve can be operated by said wire.

ANTON RAPPL.

References Cited in the file of this patent

UNITED STATES PATENTS

| Number | Name | Date |
|---|---|---|
| 995,478 | Nelson | June 20, 1911 |
| 1,030,140 | Steward | June 18, 1912 |
| 1,115,632 | Weiss | Nov. 3, 1914 |
| 1,580,877 | Barber | Apr. 13, 1926 |
| 1,905,664 | Weatherhead | Apr. 25, 1933 |
| 1,918,792 | Arens | July 18, 1933 |
| 1,953,188 | Norviel | Apr. 3, 1934 |
| 2,319,041 | Crouse | May 11, 1943 |

FOREIGN PATENTS

| Number | Country | Date |
|---|---|---|
| 695,762 | Germany | of 1940 |